United States Patent Office 3,024,240
Patented Mar. 6, 1962

3,024,240
CERTAIN ALKALI METAL-PYRIDINE-BORANE
COMPLEXES AND PROCESS
William V. Hough, Valencia, Pa., assignor to Callery
Chemical Company, Pittsburgh, Pa., a corporation of
Pennsylvania
No Drawing. Filed Dec. 21, 1959, Ser. No. 860,707
4 Claims. (Cl. 260—290)

This invention relates to alkali metal-borane derivatives of certain aromatic compounds and to a method for their preparation.

Compounds containing an alkali metal, boron and hydrogen have been found to be valuable as reducing agents in synthetic organic chemistry. The alkali metal borohydrides, for example, are selective reducing agents for certain organic functional groups. In a similar manner various organic derivatives of such compounds are useful for specialized reductions. The usefulness of many of these compounds lies primarily in their specific physical properties, such as their stability, solubility in various solvents, and the like, which make them useful in certain applications wherein special conditions and special properties are required or are desirable. However, the same characteristics and properties which make these alkali metal borohydrides particularly valuable in certain specialized applications limit their usefulness on other applications where their particular physical properties preclude their use. For such reasons, therefore, new reducing agents embodying specific properties are of constant interest and have a wide potential in the synthetic chemical field.

One object of this invention is to provide new reducing agents containing sodium, boron and hydrogen.

Another object is to provide new organic complexes which contain an alkali metal, boron and hydrogen and which may be used in the reduction of organic functional groups.

A still further object is to provide a method for the preparation of ternary complexes of an aromatic compound, an alkali metal and borane.

Other objects will become apparent from time to time throughout the following specification and claims.

This invention is based on the discovery that certain aromatic compounds will react with an alkali metal and diborane to form ternary complexes in which the aromatic compound is combined both with the alkali metal and with a borane group. (Whenever the term borane is used herein it means the $BH_3$ group, the simplest member of the borane series.)

My invention can be carried out in several ways. Thus, in one embodiment the aromatic compound can first be reacted with the alkali metal to form an adduct and this adduct can then be reacted with diborane to form a complex of the alkali metal and borane with the aromatic compound. The aromatic compound can also be first reacted with diborane, followed by the reaction with the alkali metal. This latter embodiment is particularly useful in cases in which the aromatic compound forms an adduct with diborane or borane.

Reaction of the alkali metal adduct with diborane is exothermic. Therefore, this step, while it can be initiated at room temperature (about 25° C.), results in some evolution of hydrogen from decomposition of the diborane due to the heat evolved, so that it is preferred to carry out this step by mixing the reactants at a temperature below room temperature, generally about −80° C., and then gradually warming the mixture to room temperature.

The reaction of diborane with the aromatic compound followed by the reaction with an alkali metal is easier to control if the diborane-aromatic compound adduct forms and is stable. This method is therefore preferred in those cases in which such stable adducts form, as, for example, when a phenylamine or pyridine is used as the aromatic compound.

In one test demonstrating the practice of our invention, sodium was treated with an excess of pyridine in a nitrogen atmosphere. A red solution first formed and then became an opaque deep green and the dark green sodium-pyridine complex separated out from the solution. Diborane was then added to this sodium monopyridine complex and allowed to stand until it was completely absorbed. The mixture was extracted with tetrahydrofuran and the orange brown solid remaining after the removal of the tetrahydrofuran was analyzed and found to correspond to the formula $NaC_5H_5NBH_3$.

In another test, 0.0291 gram of pyridine and 0.0054 gram of diborane were reacted at room temperature to form pyridine-borane. The pyridine-borane was reacted with 0.1698 gram of sodium metal at 115° C. for one hour. A green tar-like solid was formed and a deep blue solution was produced when the product was placed in tetrahydrofuran. The tetrahydrofuran insoluble material was unreacted sodium. The soluble material was removed from the tetrahydrofuran and analyzed. Chemical analysis, as well as infra-red analysis, showed that this product corresponded to the formula $NaC_5H_5NBH_3$.

Sodium metal was also reacted with pyridine-borane at room temperature using pyridine and tetrahydrofuran as solvents and in the absence of a solvent to yield in each case products corresponding to that obtained above. No hydrogen, diborane, pyridine or pyridine-borane was recovered in these runs. Infra-red analysis showed that the products obtained were $NaC_5H_5NBH_3$.

Other such ternary complexes can be prepared by reacting other aromatic amines, aromatic phosphines or polyethylene glycol diarylethers with other alkali metals and diborane in a similar manner.

The recovery of the desired compound is generally accomplished by conventional methods, any of several of which can be used. We have found that extraction is a particularly useful method of recovering the desired complex and that tetrahydrofuran, in which these complexes often form deep blue colored solutions, is a generally effective solvent for use in the extractive purification of these complexes.

The complexes of my invention are particularly useful as reducing agents. Thus complexes of alkali metals and borane with various aromatic compounds can be produced so as to embody varying physical properties, and the properties of these complexes can be tailored to suit particular reaction systems. For example, sodium pyridine-borane has a reducing power similar to that of pyridine-borane itself but it is in solid form, is more stable and is more easily handled. These complexes are useful in reducing organic functional groups, such as the aldehyde group, and in such reductions are used in a manner similar to the use of other solid reducing agents, such as the alkali metal borohydrides.

According to the provisions of the patent statutes, I have explained the principle and mode of practicing my invention, and have described what I now consider to be its best embodiments. However, I desire to have it understood that, within the scope of the appended claims, the invention may be practiced otherwise than as specifically described.

I claim:
1. The ternary complex sodium-pyridine-borane, $Na.C_5H_5N.BH_3$.
2. A method of producing a ternary complex of an alkali metal, pyridine and borane which comprises react- ing an alkali metal, diborane and pyridine and recovering the ternary complex thus formed.

3. A method of producing a ternary complex of sodium, pyridine and borane which comprises reacting sodium with pyridine to form a sodium-pyridine adduct, reacting the said adduct with diborane, and recovering the ternary complex thus formed.

4. A method of producing a complex of sodium, pyridine and borane which comprises reacting pyridine with diborane to form pyridine borane, and reacting the said pyridine borane with sodium, and recovering the ternary complex thus formed.

References Cited in the file of this patent

Koster: Angew. Chem., vol. 69, page 94 (1957).